US012712316B2

(12) United States Patent
Little

(10) Patent No.: US 12,712,316 B2
(45) Date of Patent: Aug. 18, 2026

(54) ELECTRICAL CONNECTOR HAVING A CAM SLIDE CONTACT LIFTER

(71) Applicants: FOXCONN (KUNSHAN) COMPUTER CONNECTOR CO., LTD., Kunshan (CN); FOXCONN INTERCONNECT TECHNOLOGY LIMITED, Grand Cayman (KY)

(72) Inventor: Terrance F. Little, Fullerton, CA (US)

(73) Assignees: FOXCONN (KUNSHAN) COMPUTER CONNECTOR CO., LTD., Kunshan (CN); FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 605 days.

(21) Appl. No.: 18/203,156

(22) Filed: May 30, 2023

(65) Prior Publication Data

US 2023/0396020 A1 Dec. 7, 2023

Related U.S. Application Data

(60) Provisional application No. 63/365,960, filed on Jun. 7, 2022.

(51) Int. Cl.
*H01R 13/629* (2006.01)
*H01R 27/00* (2006.01)

(52) U.S. Cl.
CPC ....... *H01R 13/62916* (2013.01); *H01R 27/00* (2013.01)

(58) Field of Classification Search
None
See application file for complete search history.

(56) References Cited

U.S. PATENT DOCUMENTS

| | | | | | |
|---|---|---|---|---|---|
| 3,329,926 | A * | 7/1967 | Aksu et al. | H01R 12/85 439/329 |
| 3,912,353 | A * | 10/1975 | Kasuya | H01R 12/89 439/329 |
| 4,480,886 | A * | 11/1984 | Bergamin | H01R 12/89 439/492 |
| 5,391,089 | A * | 2/1995 | Quickel | H01R 13/193 439/260 |
| 6,816,376 | B2 | 11/2004 | Bright et al. | |
| 7,303,438 | B2 | 12/2007 | Dawiedczyk et al. | |
| 9,250,402 | B2 | 2/2016 | Ishii et al. | |
| 9,614,311 | B2 * | 4/2017 | Duenkel | H01R 13/05 |
| 9,780,473 | B2 * | 10/2017 | Sasaki | H01R 13/187 |

(Continued)

OTHER PUBLICATIONS

OSFP MSA Specification for OSFP Octal Small Form Factor Pluggable Module Revision 3.0, Mar. 14, 2020.

*Primary Examiner* — Felix O Figueroa
(74) *Attorney, Agent, or Firm* — Ming Chieh Chang

(57) ABSTRACT

An electrical connector includes: an insulative housing having a mating cavity; a row of upper contacts and a row of lower contacts secured in the insulative housing, the row of upper contacts and the row of lower contacts having respective contacting portions exposed to the mating cavity; a lifter operable relative to the insulative housing to move the row of lower contacts upwardly; and a pair of springs arranged at intervals. The insulating housing forms a pair of holes for accommodating the pair of springs. The lifter has a pair of posts extending into the pair of holes to interact with the pair of springs.

6 Claims, 13 Drawing Sheets

(56) References Cited

U.S. PATENT DOCUMENTS

| | | | | |
|---|---|---|---|---|
| 11,043,780 | B2 | 6/2021 | Wang | |
| 11,322,894 | B2 * | 5/2022 | Little | H01R 13/6594 |
| 2019/0089106 | A1 | 3/2019 | Regnier | |

* cited by examiner

ELECTRICAL CONNECTOR HAVING A CAM SLIDE CONTACT LIFTER

BACKGROUND OF THE INVENTION

Field of the Invention

The present invention relates to an electrical connector designed for backward compatibility of pluggable electronic modules.

Description of Related Arts

OSFP MSA Specification for Octal Small Form Factor Pluggable Module, Revision 3.0, Mar. 14, 2020, defines electrical connectors, OSFP modules, and cage systems. With an MSA-driven specification for OSFP-XD (extra density) pluggable transceivers under development, it is desirable that OSFP-XD connectors can be backward compatible with OSFP transceiver modules.

SUMMARY OF THE INVENTION

The main object of the present invention is to provide an electrical connector that can be compatible with pluggable modules of different paddle card thicknesses.

An electrical connector comprises: an insulative housing having a mating cavity; a plurality of contacts including a row of upper contacts and a row of lower contacts secured in the insulative housing, the row of upper contacts and the row of lower contacts having respective contacting portions exposed to the mating cavity; and a lifter operable relative to the insulative housing to move the row of lower contacts upwardly.

Compared to prior art, the lifter can be operated relative to the insulating housing to move the row of lower contacts upwardly, so that the electrical connector can be compatible with pluggable modules with different paddle card thicknesses.

DETAILED DESCRIPTION OF THE PREFERRED EMBODIMENT

Figure 1:
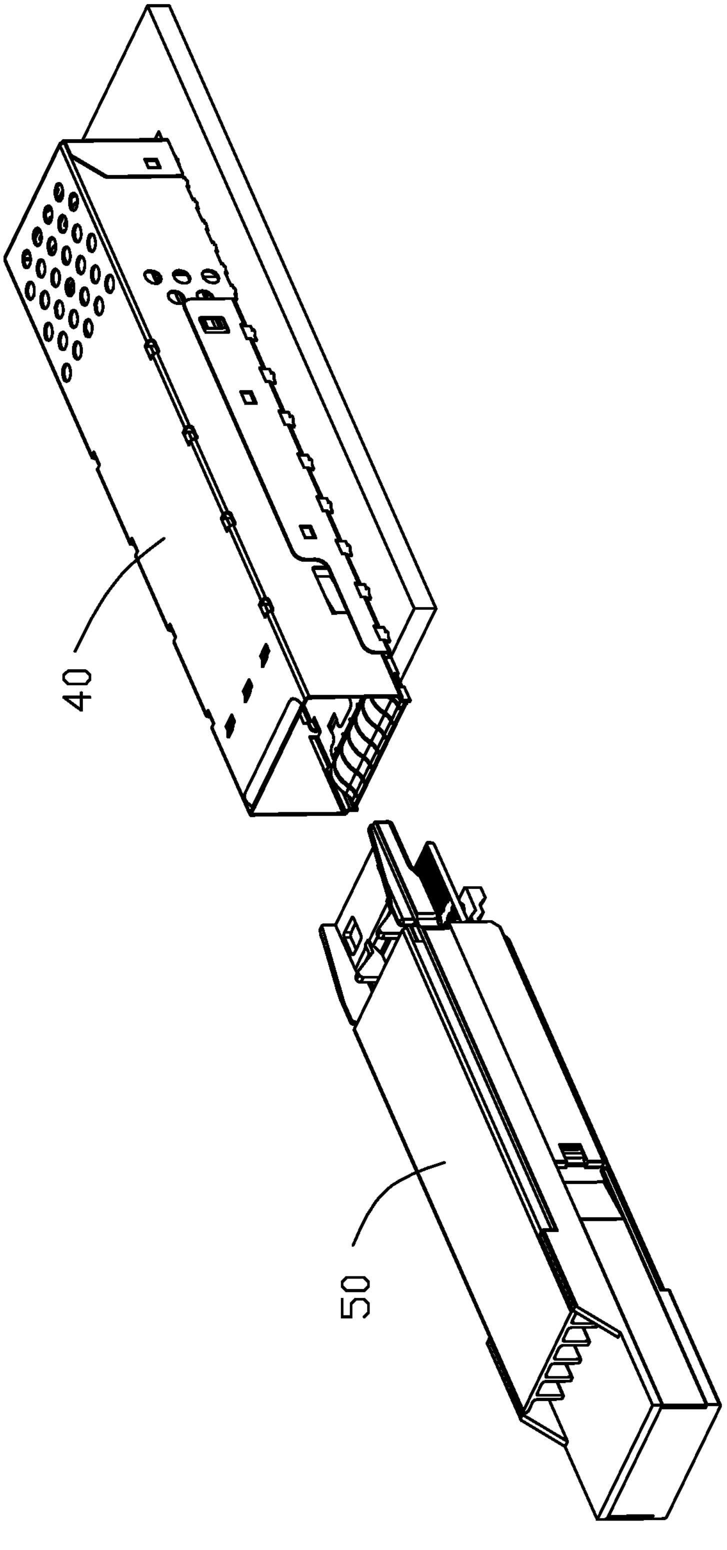
FIG. 1 is a perspective view of an electrical connector and cage system mounted on a printed circuit board for adapting to a first electronic module.
Figure 2:
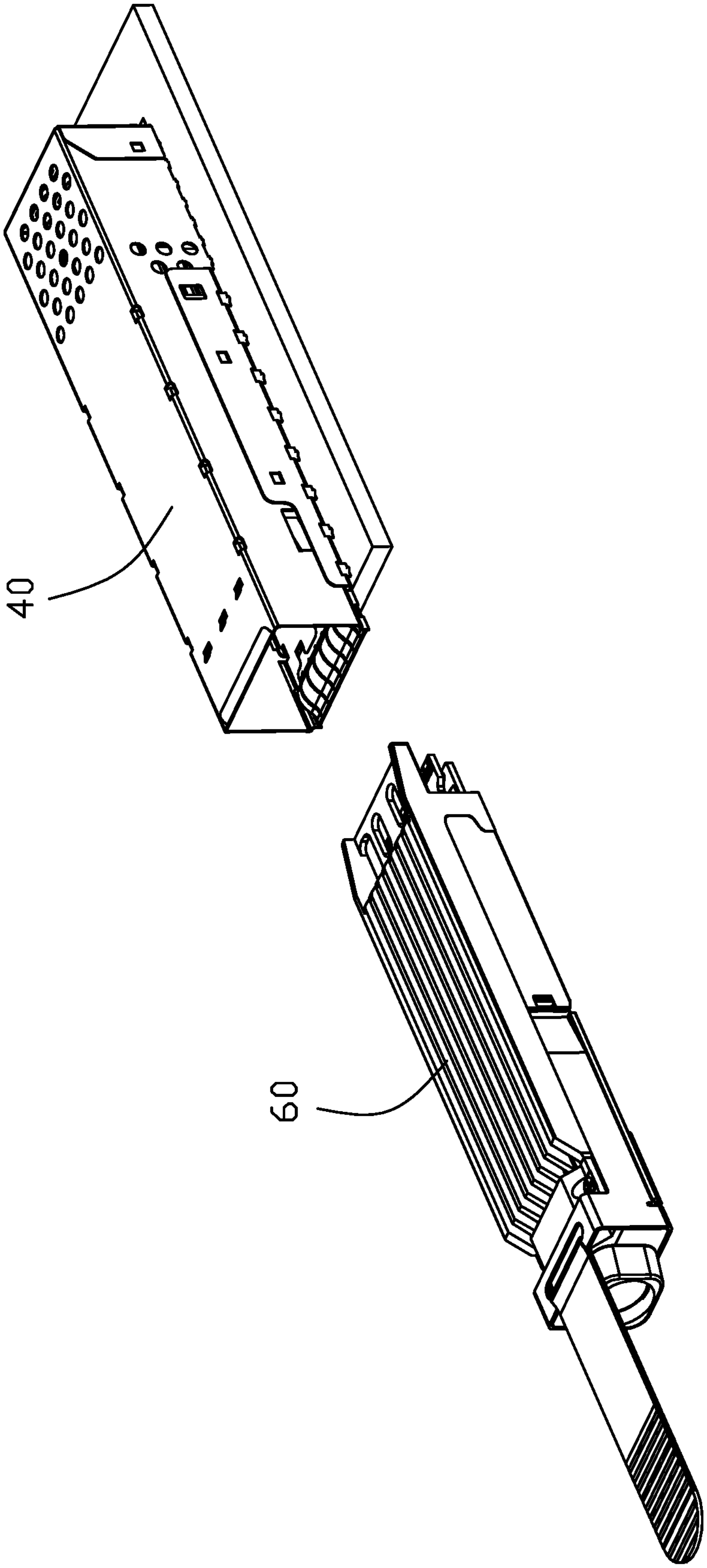
FIG. 2 is a perspective view of the electrical connector and cage system for adapting to a second electronic module.
Figure 3:
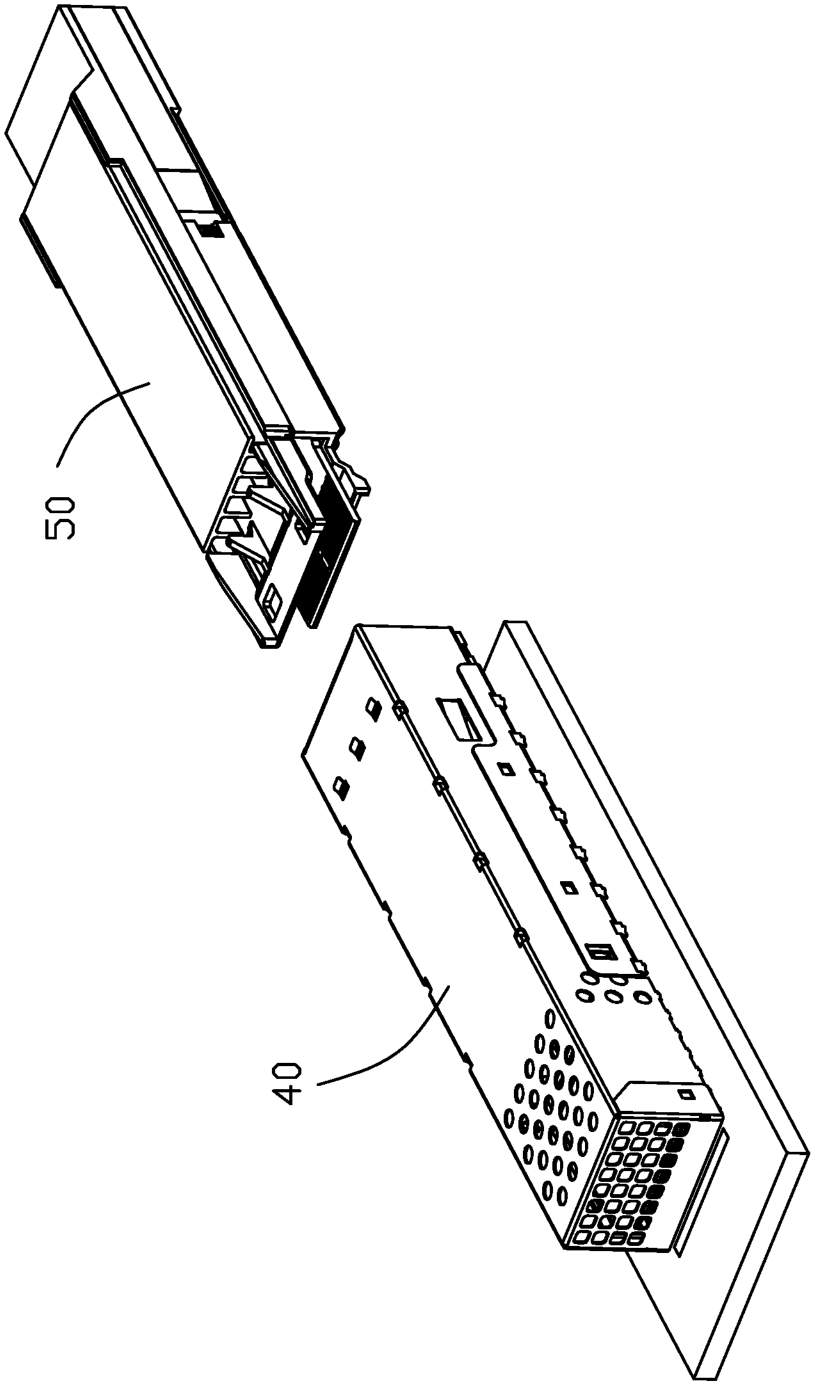
FIG. 3 is a view similar to FIG. 1 but from a different perspective.
Figure 4:
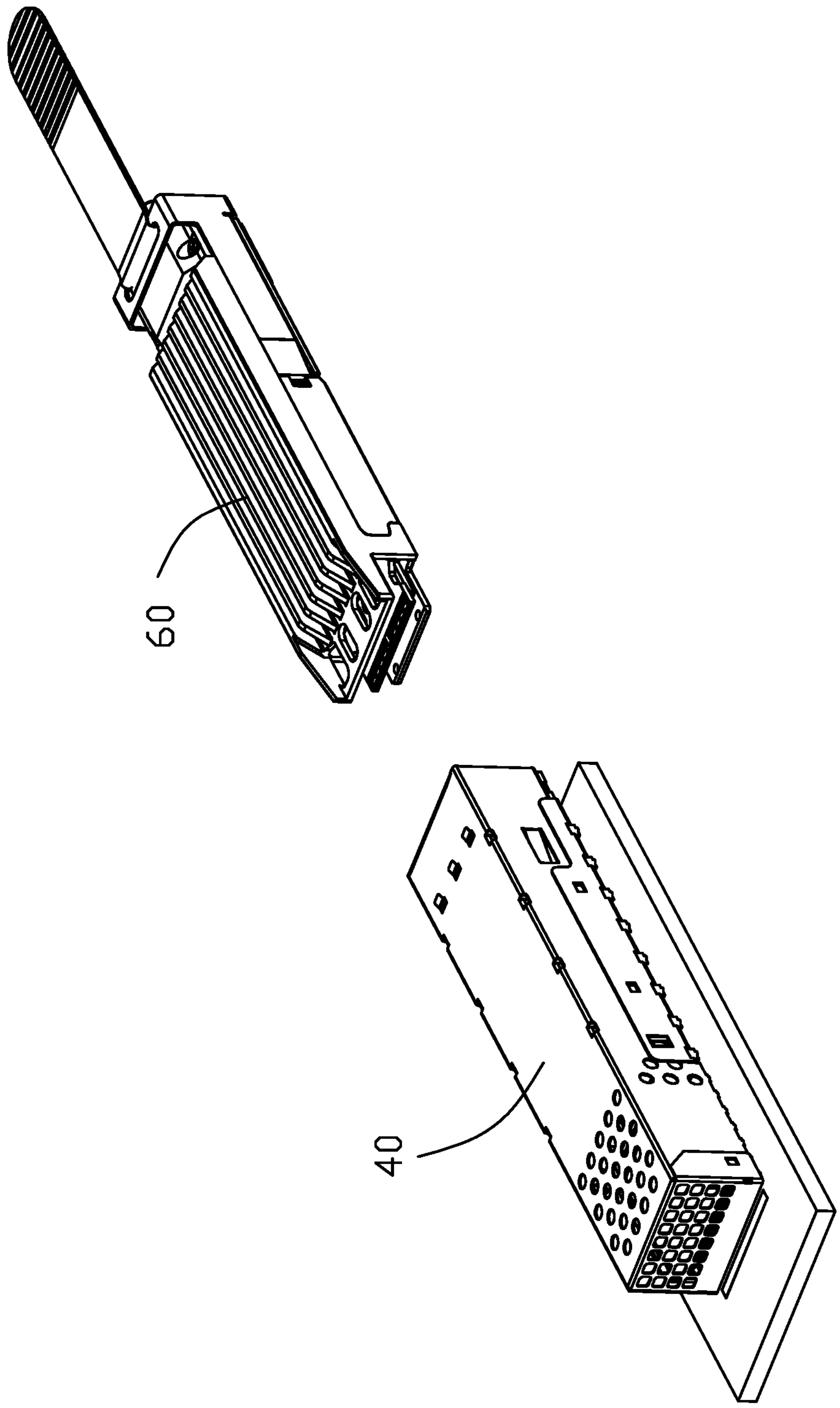
FIG. 4 is a view similar to FIG. 2 but from a different perspective.
Figure 5:
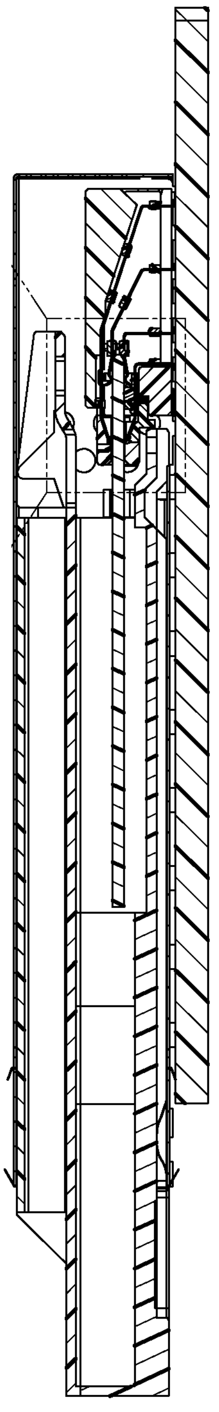
FIG. 5 is a cross-sectional view of the electrical connector and cage system mated to the first electronic module and FIG. 5A shows a broken out and enlarged portion of FIG. 5.
Figure 5A:
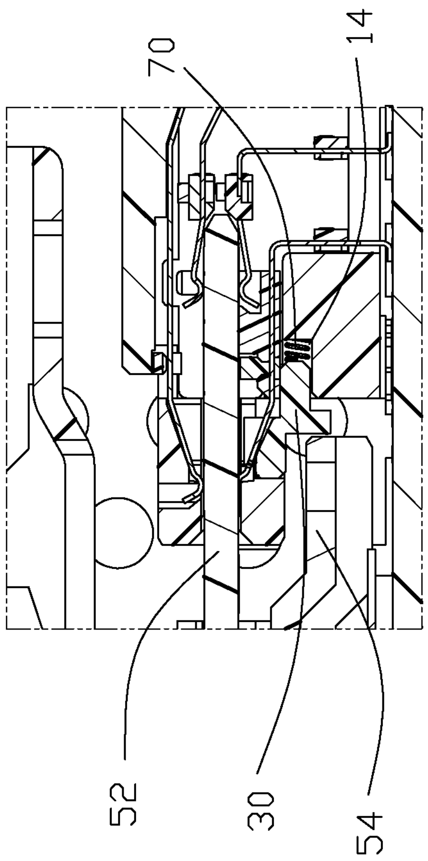
Figure 6:
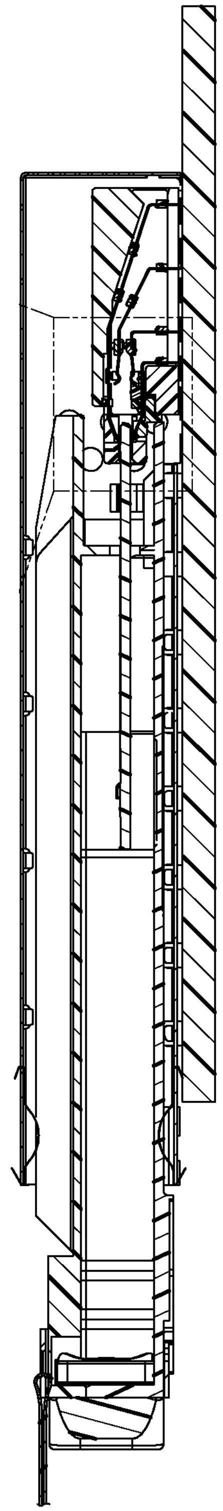
FIG. 6 is a cross-sectional view of the electrical connector and cage system mated to the second electronic module and FIG. 6A shows a broken out and enlarged portion of FIG. 6.
Figure 6A:
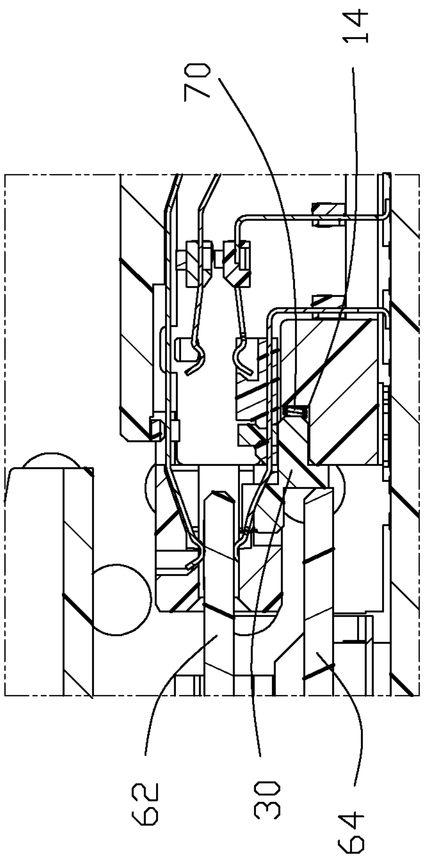

Referring to FIGS. 1-10, an electrical connector 100 comprises: an insulative housing 10 having a mating cavity 12; a plurality of contracts 20 including a row of upper contacts and a row of lower contacts secured in the insulative housing 10, the row of upper contacts and the row of lower contacts having respective contacting portions 22 exposed to the mating cavity 12; and a lifter 30 operable relative to the insulative housing 10 to move the row of lower contacts upwardly. The connector 100 is mounted inside a cage 40.

The electrical connector 100 can be matched with different optical modules or cable plugs. The present embodiment uses OSFP legacy versus OSFP-XD as examples. In a basic form factor overview, OSFP legacy module 60 has 16 high speed signal pairs. OSFP-XD will double the amount of signal pins to accommodate 32 high speed pairs by adding a second row of contacts behind current OSFP contacts. The thick paddle card of OSFP legacy module 60 is 1.0 mm. Because OSFP-XD is expected to have 32 differential signal pairs, it may not be feasible to use a 1.0 mm thick paddle card (i.e., internal printed circuit board). To add more layers for trace routing, the paddle card may increase thickness from 1.0 mm to 1.2 mm, for example, or even 1.5 mm. The present invention aims to design the connector to be backwards compatible to accept both 1.0 mm and 1.2 mm thick paddle cards. On the other hand, an OSFP legacy module has a lower flange extending forwardly about 9.62 mm. An OSFP-XD may be designed to have a lower flange that is shorter than 9.62 mm in order for the lower flange of the OSFP legacy module to extend forwardly more than the lower flange of the OSFP-XD module. This difference in extent of extension may be utilized to actuate the lifter, as will be detailed later.

Figure 7:
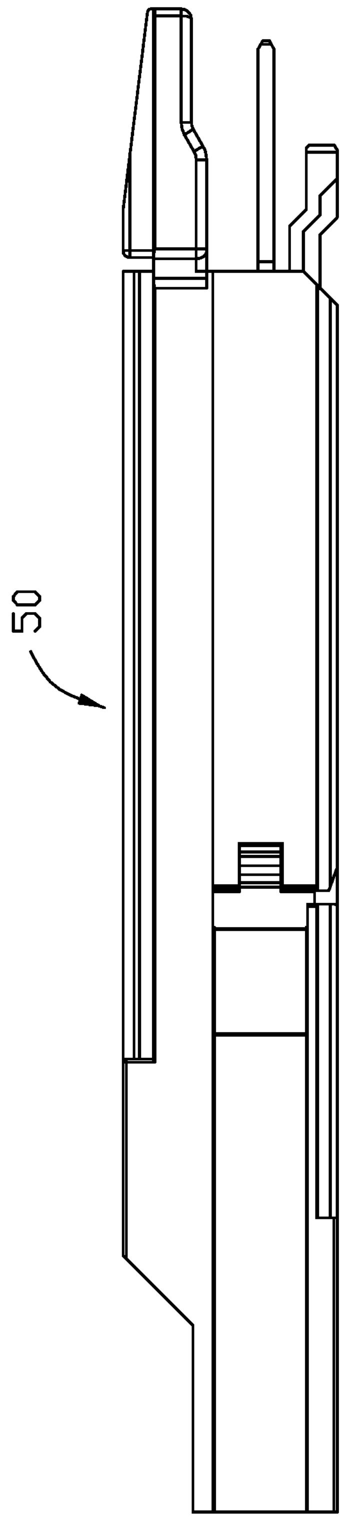
FIG. 7 is a side view of the first electronic module.
Figure 8:
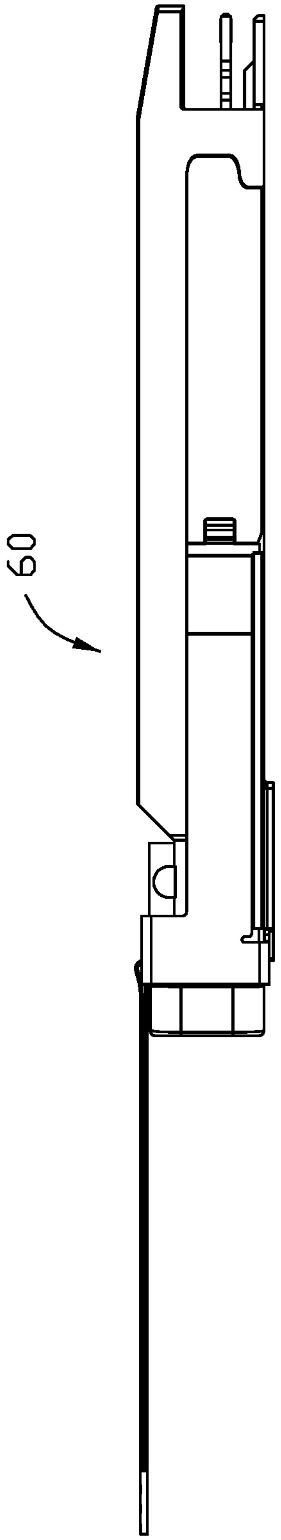
FIG. 8 is a side view of the second electronic module.
Figure 9:
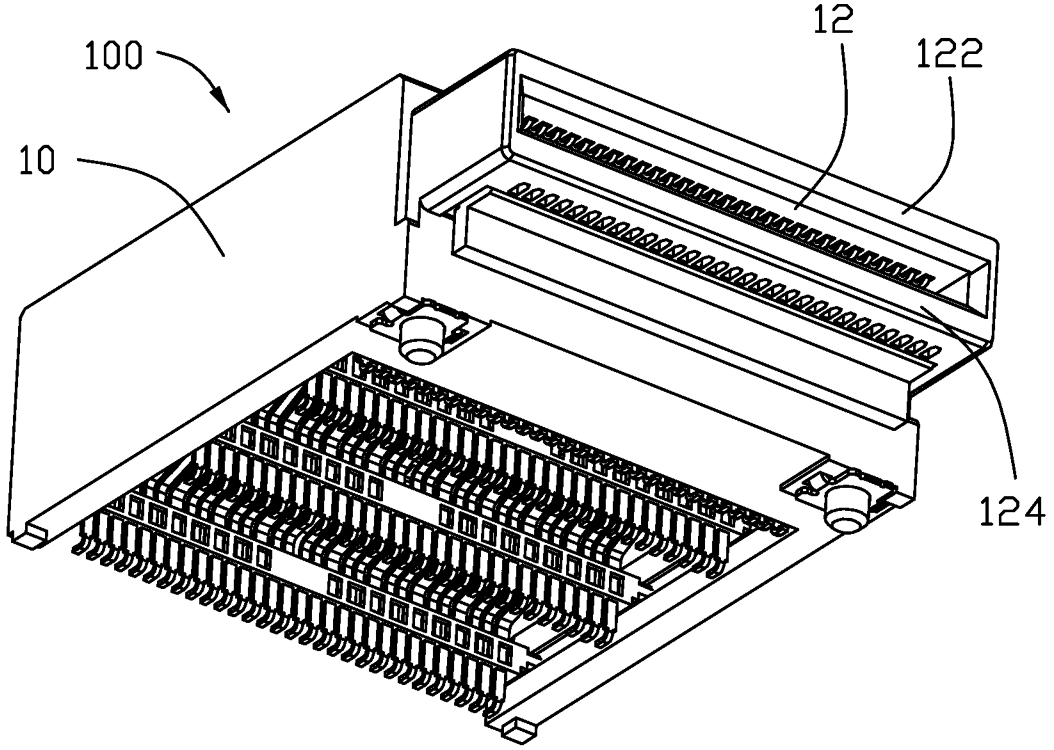
FIG. 9 is a bottom perspective view of the electrical connector.
Figure 10:
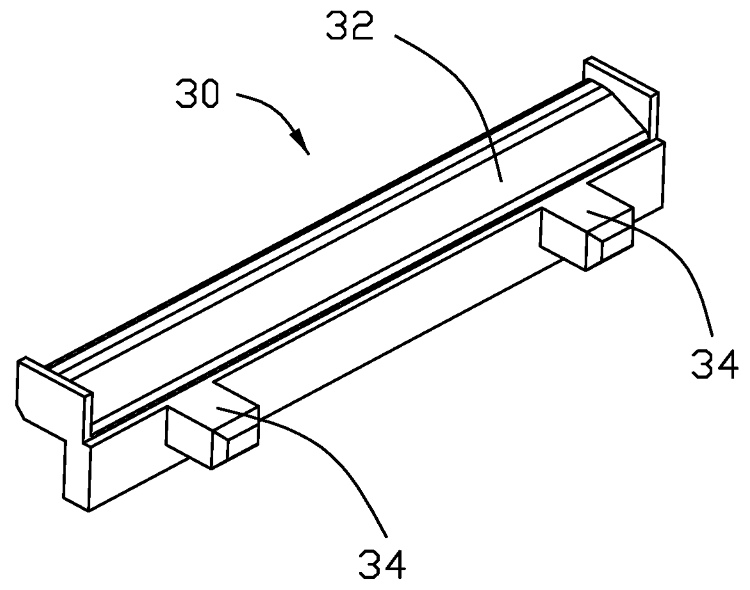
FIG. 10 is a perspective view of a lifter of the electrical connector.
Figure 11:
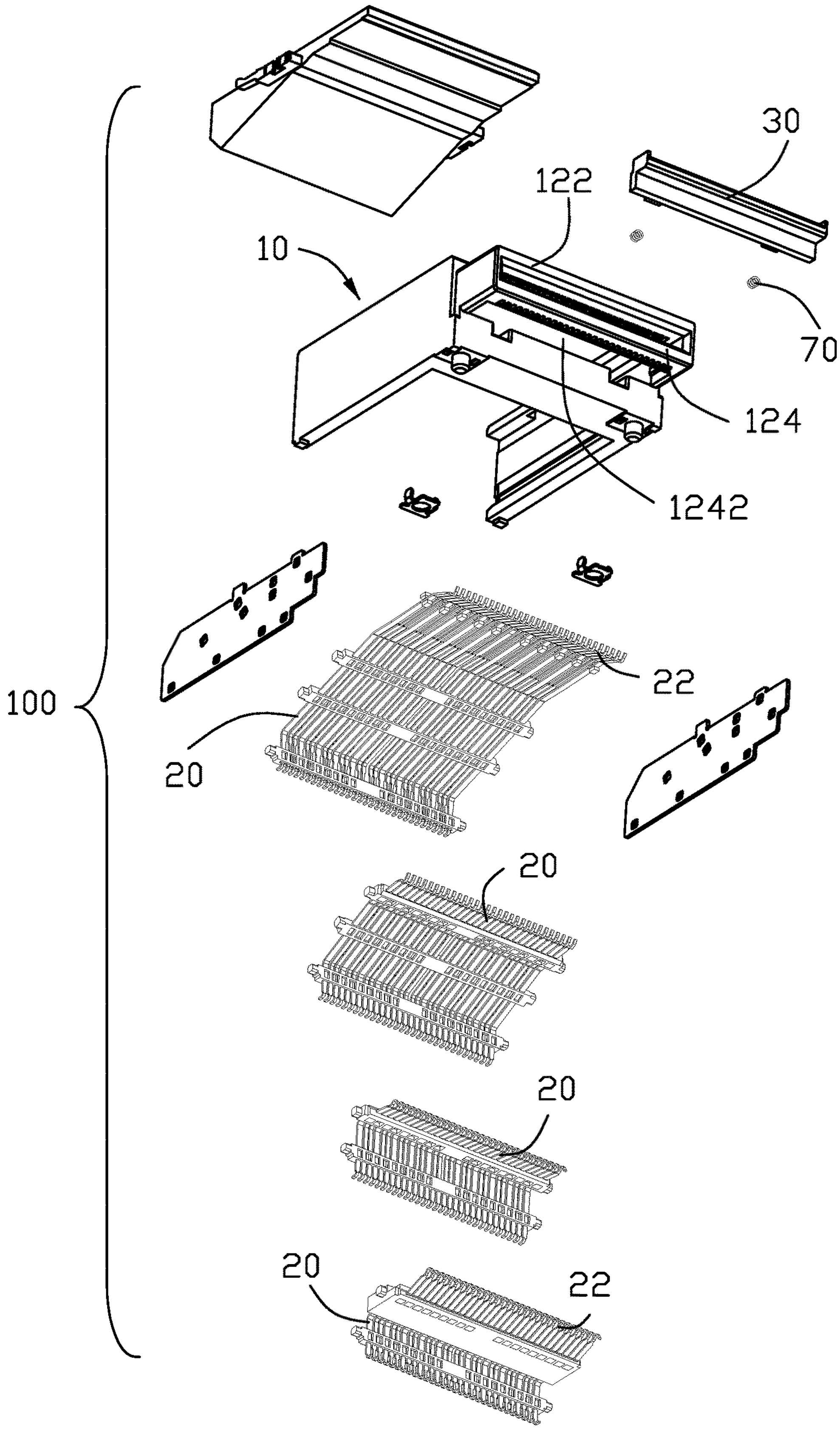
FIG. 11 is an exploded view of the electrical connector.

An OSFP-XD module 50 with 1.2 mm thick paddle card 52 and an OSFP legacy module 60 with 1.0 mm thick paddle card 62 are shown in side views in FIG. 7 and FIG. 8, respectively. Also shown is a lower flange 54 of the OSFP-XD module 50 being shorter than a lower flange 64 of the OSFP legacy module 60. Current OSFP modules are known to have latch features, namely, latching pockets and a latch release mechanism at both sides thereof. As for the cage of the OSFP module, flaps are disposed on both sides thereof to latch the module into the cage. Moreover, cage forward stop and module forward stop are designed to determine a forward inserted position of the module into the cage.

Referring to FIGS. 5-6 and 9-10 in particular, the lifter 30, in the form of a cam slide contact lifter in this embodiment, is designed to be operated by the OSFP legacy module 60, namely, the lower flange 64 thereof, in order to increase a normal force of the row of lower contacts on the paddle card 62 thereof. The lifter 30 only lifts the row of lower contacts to increase the normal force of the row of lower contacts on the 1.0 mm thick paddle card 62, thereby achieving backward compatibility. A pair of springs 70 may be disposed in a corresponding pair of holes 14 of the insulative housing 10 to provide a biasing force returning the lifter 30 back to its original position. In other embodiments, the spring 70 can also be replaced by other elastic members. The lower flange 54 of the OSFP-XD module 50 is shorter than the lower flange 54 of the OSFP legacy module 60. Therefore, as the OSFP-XD module 50 is inserted into the electrical connector 100, the lifter 30 at its original position is not contacted by the shorter lower flange 54 of the OSFP-XD module 50 and the row of lower contacts each applies upwardly an adequate normal force on the paddle card 52. Differently, the lower flange 64 of the OSFP legacy module 60 is longer, and the lifter 30 can be activated to raise the row of lower contacts, specifically, as the OSFP legacy module 60 is inserted into the electrical connector 100, the longer lower flange 64 of an inserted OSFP legacy module 60 would engage and move the lifter 30 away from its original position which in turn move the row of lower contacts upwardly to compensate for a normal force that otherwise would have been lowered due to a thinner paddle card 62 compared to the paddle card 52. The lifter 30 is useful for the OSFP legacy modules 60 but not for the OSFP-XD modules 50. As the OSFP legacy module 60 pulled out of the electrical connector 100, the springs 70 stretches, and the lifter 30 returns to its original position.

Construction of the insulative housing in relation to the plurality of contacts is generally well known. For example, the plurality of contacts may be constructed to include four contact assemblies that are stacked together with or without the aid of a pair of side metallic plate and then mounted in the insulative housing. In the case of four contact assemblies, the plurality of contracts include another row of upper contacts and another row of lower contacts having respective contacting portions exposed to the mating cavity and behind the contacting portions of the row of upper contacts and the contacting portions of the row of lower contacts, respectively. Instead of board-mount applications, the plurality of contacts may even be constructed to have respective tails adapted for overpass application for connecting to cable wires.

The mating cavity 12 is enclosed by an upper wall 122 and a lower wall 124 of the insulative housing 10. The lower wall 124 has a slot 1242 to expose the row of lower contacts and the lifter 30 extends into the slot 1242 to operate the row of lower contacts. The lifter 30 has a ramp surface 32 to bear against the inclined portions of row of lower contacts for a smooth operation and a pair of posts 34 extending into the pair of holes 14 of the insulative housing 10 to interact with the pair of springs 70 in a suitable and/or desired manner generally known to those skilled in this art. Each of the row of lower contacts is provided with an inclined portion connected to associated contacting portion.

The invention claimed is:

1. An electrical connector comprising:

an insulative housing having a mating cavity;

a plurality of contacts including a row of upper contacts and a row of lower contacts secured in the insulative housing, the row of upper contacts and the row of lower contacts having respective contacting portions exposed to the mating cavity;

a lifter operable relative to the insulative housing to move the row of lower contacts upwardly; and an elastic member for biasing the lifter upon operated;

wherein the elastic member comprises a pair of springs arranged at intervals, the insulating housing forms a pair of holes for accommodating the pair of springs, and the lifter has a pair of posts extending into the pair of holes to interact with the pair of springs.

2. The electrical connector as claimed in claim 1, wherein the mating cavity is enclosed by an upper wall and a lower wall of the insulative housing, the lower wall having a slot to expose the row of lower contacts, and the lifter extends into the slot.

3. The electrical connector as claimed in claim 1, wherein the lifter has a ramp surface to bear against the row of lower contacts.

4. The electrical connector as claimed in claim 3, wherein each of the lower row of contacts has an inclined portion connected to an associated contacting portion, and the ramp surface of the lifter is operable to abut against lower surfaces of the inclined portions of the row of lower contacts and lift the contacting portions of the row of lower contacts upward.

5. The electrical connector as claimed in claim 1, wherein the plurality of contracts include another row of upper contacts and another row of lower contacts having respective contacting portions exposed to the mating cavity and behind the contacting portions of the row of upper contacts and the contacting portions of the row of lower contacts, respectively.

6. The electrical connector as claimed in claim 1, further comprising a pair of side metallic plates to assemble the row of upper contacts, the row of lower contacts, said another row of upper contacts, and said another row of lower contacts together in position.

* * * * *